Figure 1:
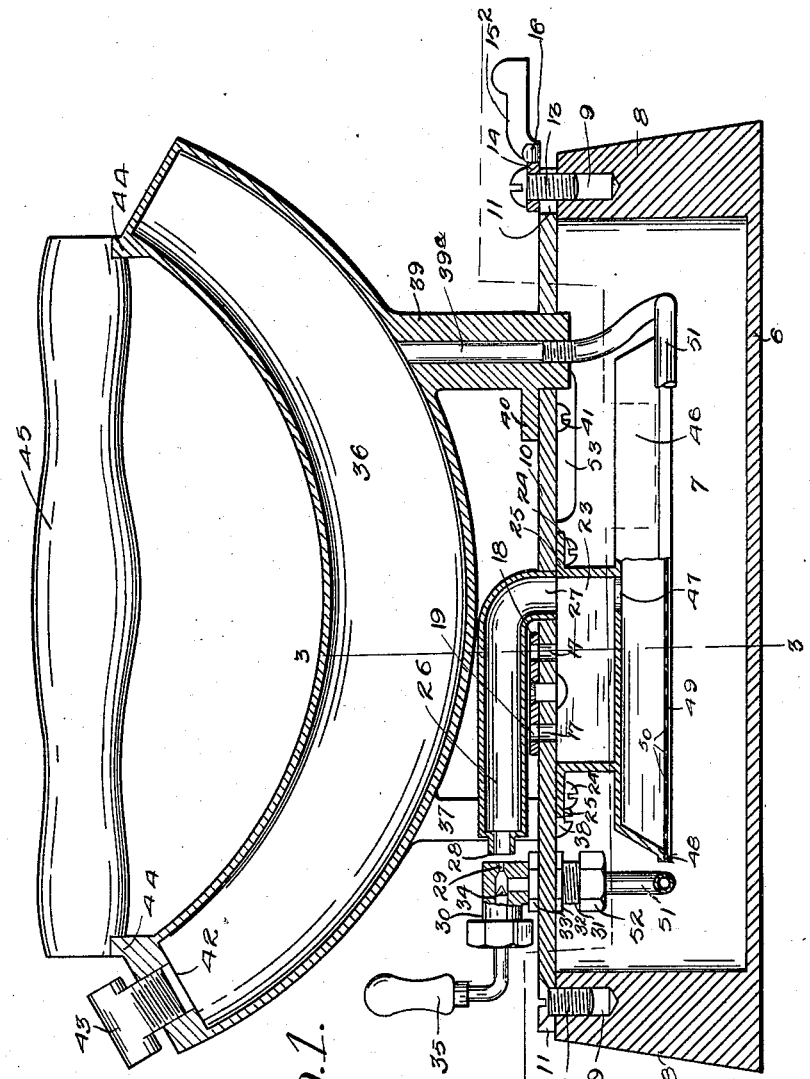

C. S. KONIGSBERG.
SELF HEATING SAD IRON.
APPLICATION FILED FEB. 28, 1911.

1,000,820.

Patented Aug. 15, 1911.

2 SHEETS—SHEET 1.

Witnesses
H. A. Stock.
H. Schroeder

Inventor
CHARLES S. KONIGSBERG

By E. E. Trooman,
Attorney.

C. S. KONIGSBERG.
SELF HEATING SAD IRON.
APPLICATION FILED FEB. 28, 1911.
1,000,820.
Patented Aug. 15, 1911.
2 SHEETS—SHEET 2.
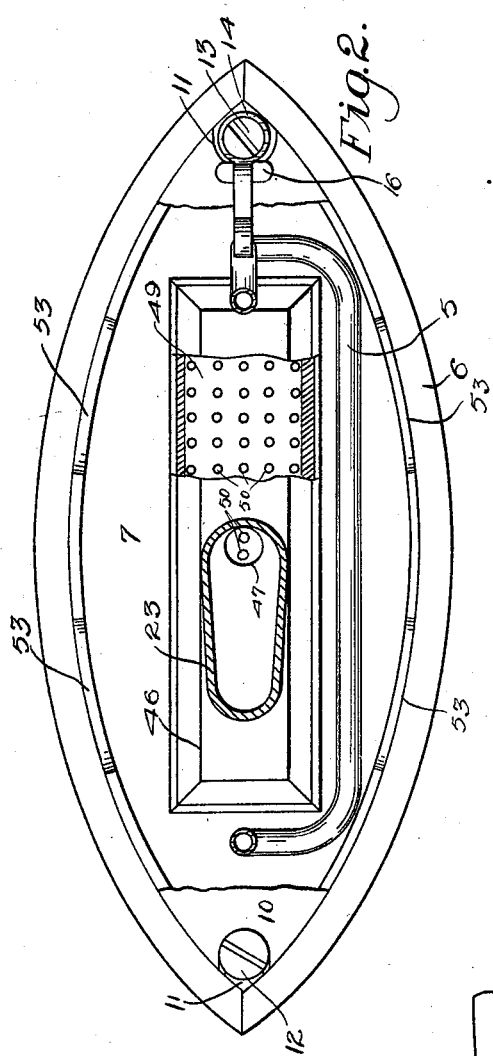
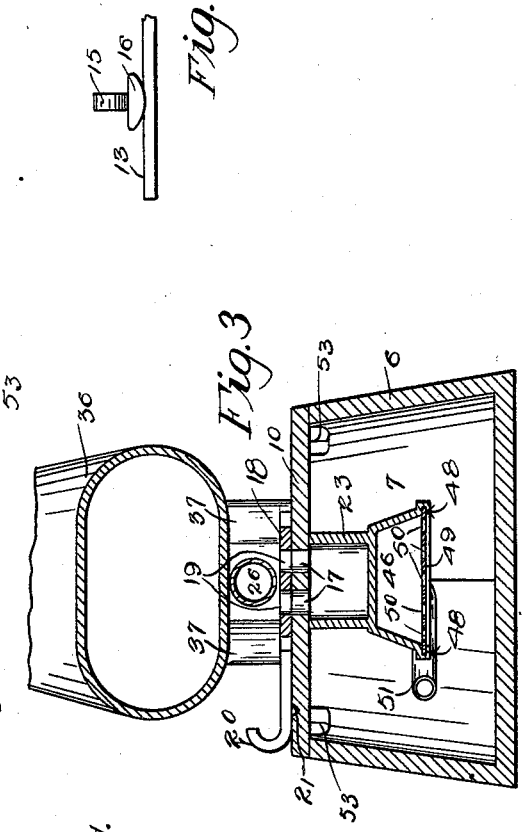
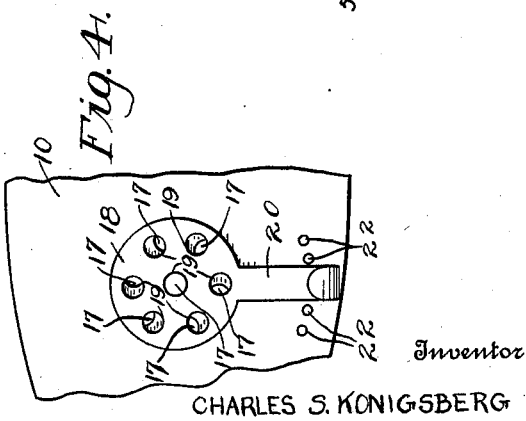
Inventor
CHARLES S. KONIGSBERG
By E. O. Vrooman,
Attorney.

UNITED STATES PATENT OFFICE.

CHARLES S. KONIGSBERG, OF OAKLAND, CALIFORNIA, ASSIGNOR OF ONE-THIRD TO GEORGE F. WITTER, OF OAKLAND, CALIFORNIA.

SELF-HEATING SAD-IRON.

1,000,820.  Specification of Letters Patent.  Patented Aug. 15, 1911.

Application filed February 28, 1911. Serial No. 611,344.

*To all whom it may concern:*

Be it known that I, CHARLES S. KONIGSBERG, a citizen of the United States, residing at Oakland, in the county of Alameda and State of California, have invented certain new and useful Improvements in Self-Heating Sad-Irons, of which the following is a specification.

This invention relates to self heating sad irons, and the principal object of the same is to provide a hollow body and a removable cover therefor, the cover having a burner suspended therefrom, within the body, and a handle and fuel reservoir projecting from its outer surface so that by removing the cover from the body, the heating means are also removed.

In carrying out the objects of the invention generally stated above it is contemplated providing simple means for locking the cover to the body, a novel burner, and novel means whereby the fuel supply can be controlled to regulate the flames of the burner.

In the accompanying drawings a preferred and practical embodiment of the invention has been shown, wherein,—

Figure 1 is a central vertical longitudinal sectional view of the improved sad iron. Fig. 2 is a horizontal sectional view taken on the line 2—2 of Fig. 1. Fig. 3 is a transverse vertical sectional view taken on the line 3—3, Fig. 1. Fig. 4 is a detail fragmentary view showing a valve controlled air supply for the burner. Fig. 5 is a detail fragmentary view of a clamp for locking the cover to the body of the iron.

Referring to the accompanying drawings by numerals it will be seen that the improved sad iron comprises a body 6 that is hollow to provide a cavity 7 having the thickened end walls 8 each of which is provided with a threaded vertical opening 9. A flat cover 10 is provided for the body 6 and has rounded end recesses 11 formed therein which surround the end openings 9 of the said body. A screw 12 is provided for one of the openings 9 and one of the recessed ends of the cover 10 is fitted beneath the head of said screw. The other opening 9 is engaged by the screw 13 which has a collar 14 beneath its head from which a handle 15 projects. Adjacent to the junction of said handle 15 and collar 14 a clamping plate 16 is carried by said handle, said plate being in the form of a cam so that by rotating the handle in one direction, the plate 16 will have a binding engagement with the cover and thereby lock the cover to the body, and by rotating said handle in an opposite direction, the plate will be brought into alinement with the end slot so that the cover can be lifted over the plate and its opposite end slid from beneath the head of the screw 12, thereby entirely freeing the cover from the body.

The cover 10 is provided with a circular row of openings 17 and a disk valve 18 is pivotally connected to said cover over said openings. The valve 18 is provided with a circular row of openings 19 complemental to the openings 17 and adapted to be alined therewith or thrown out of alinement by rotating said disk. A handle 20 is provided to facilitate rotating the disk 18, said handle being provided with a pendent lug 21 adapted to be selectively engaged with the recesses 22 in the cover 10 to lock the disk in the desired position. A mixing chamber 23 is suspended from the cover 10 beneath the openings 17 by means of screws 24 that pass through upper flanges 25 and engage said cover. As will be clear from the foregoing the openings 17 are for the purpose of supplying air to the chamber 23, and the amount of air supplied is controlled by the valve 18.

A mixing tube 26 has a downturned end 27 extended through the cover 10 and in communication with the chamber 23. The reduced inlet end 28 of said tube is arranged in spaced alinement with the discharge outlet 29 of a valve casing 30. The casing 30 has its inlet end 31 extending through the cover 10 and is fastened thereto by the lock nuts 32 and 33. The discharge from said casing is controlled by a needle valve 34, the stem of which carries a handle 35.

A fuel reservoir 36 has legs 37 at one portion fastened to the cover 10 by screws 38 and at another portion has an enlarged leg 39 extending into the cover and provided with a central longitudinal fuel passage 39ª. The leg 39 has a flange 40 that is fastened to the cover 10 by the screw 41. The reservoir 36 is preferably bent on an arc of a circle, and one end is provided with a threaded filling opening 42 that is normally sealed by a plug 43. The ends of said reservoir carry lugs 44 upon which the handle 45 is seated.

An elongated and preferably rectangular hollow burner 46 is carried by the chamber 23 and fuel is fed to said burner through the opening 47 in the bottom of said chamber. Preferably the chamber 23 and the burner 46 are integral. The inner surfaces of the lower longitudinal edges of the burner 46 are provided with grooves 48 for the reception of a cover plate 49 that is provided with a plurality of perforations 50.

The lower end of the fuel passage 39ª is threaded for the reception of a fuel pipe 51. The pipe 51 extends parallel with one side of the burner 46 and places the fuel passage 39ª and the inlet 31 of the valve casing in communication. A nut 52 is used for locking the pipe 51 to the valve casing.

It will be clear from the foregoing that fuel from the reservoir is discharged into the mixing tube 26 by the casing 30, air being injected as said casing and tube are in spaced relation. From the tube 26, the fuel passes to the chamber 23, then to the burner 46 where the fuel is ignited and discharges a plurality of flames through the openings in the cover plate 49. Openings 53 are provided in the body 6 for the escape of the products of combustion. Obviously the needle valve controls the fuel supply, and the disk valve is used to supply additional air when necessary.

Alcohol or the like may be used, and in use sufficient of the fuel is ignited in the body 6 and the cover 10 which carries the burner and the fuel supply, is fastened over said body so that the said burner will be heated and thereby vaporize the fuel.

Having described the invention, what I claim as new, is:—

1. A self-heating sad iron comprising a hollow body provided with threaded end openings, a screw engaging one opening, a cover for said body having end slots, one of which engages said screw, a clamp including a screw for engaging the other opening, a plate carried by the clamp for binding engagement with the cover to lock the same to the body, and a handle for operating the clamp, a burner carried by said cover and depending into said body, and a source of fuel supply carried by said cover.

2. A self heating sad iron comprising a hollow body, a cover therefor provided with perforations, means for locking the cover to said body, a perforated disk valve pivotally connected to said cover over the perforations therein, a mixing chamber depending from the cover beneath said perforations, a burner carried by said chamber, means for supplying fuel to said chamber, and a fuel reservoir carried by the cover for delivering fuel to the fuel supplying means.

3. A self heating sad iron comprising a hollow body, a cover therefor, means for fastening the cover to the body, a mixing chamber carried by the under surface of said cover, a burner carried by the chamber, a fuel mixer extending through said cover and in communication with said chamber, a discharge valve for delivering fuel to said mixer, a fuel reservoir carried by the cover and having a discharge outlet extending into the hollow body, and a fuel pipe connecting the said outlet and the discharge valve.

4. A self heating sad iron comprising a hollow body, a cover therefor provided with perforations and locking recesses adjacent thereto, a mixing chamber carried by the cover beneath said perforations, a burner carried by said chamber, a perforated disk valve pivotally connected to the cover for controlling the perforations therein, a handle for operating said valve, a lug carried by said handle for selectively engaging the recesses to lock the handle, and means for supplying fuel to said chamber.

In testimony whereof I affix my signature in presence of two witnesses.

CHARLES S. KONIGSBERG.

Witnesses:
H. C. SCHROEDER,
F. P. SCHROEDER.